United States Patent
He et al.

(10) Patent No.: US 7,212,343 B1
(45) Date of Patent: May 1, 2007

(54) COMPACT WAVELENGTH MULTIPLEXER/DEMULTIPLEXER AND METHOD FOR MAKING THE SAME

(75) Inventors: Chun He, Fremont, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 116 days.

(21) Appl. No.: 10/618,272

(22) Filed: Jul. 11, 2003

(51) Int. Cl.
*G02B 27/10* (2006.01)

(52) U.S. Cl. ........................ 359/618; 359/619
(58) Field of Classification Search ............... 359/618, 359/619, 629, 631, 634, 621, 627, 639; 385/14, 385/17, 18
See application file for complete search history.

(56) References Cited

U.S. PATENT DOCUMENTS

| | | | |
|---|---|---|---|
| 5,583,683 A | | 12/1996 | Scobey |
| 6,097,540 A | * | 8/2000 | Neuberger et al. .......... 359/618 |
| 6,198,857 B1 | * | 3/2001 | Grasis et al. .................. 385/24 |
| 6,415,082 B1 | * | 7/2002 | Wach ........................... 385/39 |
| 6,532,325 B2 | | 3/2003 | Liu |
| 6,636,654 B2 | * | 10/2003 | McGuire, Jr. ................. 385/17 |
| 6,751,373 B2 | * | 6/2004 | Jeong .......................... 385/24 |
| 2003/0215240 A1 | * | 11/2003 | Grann et al. ................. 398/85 |
| 2004/0067014 A1 | * | 4/2004 | Hollars et al. ............... 385/33 |

\* cited by examiner

*Primary Examiner*—Timothy Thompson
*Assistant Examiner*—Jerry Fang
(74) *Attorney, Agent, or Firm*—Joe Zheng (57) ABSTRACT

Designs of multiplexing/demultiplexing modules configured for N channels are disclosed. One of the features in the designs is to provide at least one concave mirror for compenstating filter tilting errors. The concave mirrors is placed where an incident traveling distance of a light beam is substantially similar or equal to the reflected traveling distance of the beam such that the filter tilting errors successively introduced over a number of optical filters can be successively reduced, compensated or removed over a subsequent number of optical filters as the light beams travels.

17 Claims, 8 Drawing Sheets

COMPACT WAVELENGTH MULTIPLEXER/DEMULTIPLEXER AND METHOD FOR MAKING THE SAME

BACKGROUND OF THE INVENTION

1. Field of the Invention

The invention is generally related to the area of optical components. In particular, the invention is related to compact wavelength multiplexer/demultiplexer and method for making the same.

2. The Background of Related Art

The future communication networks demand ever increasing bandwidths and flexibility to different communication protocols. WDM (Wavelength Division Multiplexing) is one of the key technologies for such optical fiber communication networks. WDM employs multiple wavelengths in a single fiber to transmit in parallel different communication protocols and bit rates. Transmitting several channels in a single optical fiber at different wavelengths can multi-fold expand the transmission capacity of the existing optical transmission systems, and facilitate many functions in optical networking. An international standard wavelength grid has been suggested by ITU (International Telecommunication Union) for the center wavelengths of WDM systems. Different technologies have thus been developed to divide or combine channels or subgroups of channels in the ITU grid.

From a terminology's viewpoint, a device that multiplexes different wavelength channels or groups of channels into one fiber is a multiplexer, and a device that divides the multiplexed channels or groups of channels into individual or subgroups of channels is a demultiplexer. Specifically, a multiplexer combines several channels of optical signals into a single signal, or in reverse a demultiplexer separates a single multichannel signal into several individual channel signals, such multiplexer/demultiplexer is referred to a multiplexing/demultiplexing module, or simply multiplexer or demultiplexer.

Known devices for multiplexing/demultiplexing have employed, for example, diffraction gratings, arrayed waveguide gratings and various types of fixed or tunable filters. Gratings typically require complicated alignment systems and have been found to provide poor efficiency and poor stability under changing ambient conditions. Fixed wavelength filters, such as interference coatings, can be made substantially more stable, but transmit only a single wavelength or wavelength band.

U.S. Pat. No. 5,583,683 to Scobey discloses an optical multiplexing device that spatially disperses collimated light from a fiber optic waveguide into individual wavelength bands, or multiplexes such individual wavelength bands to a common fiber optic waveguide or other destination. An optical block has an optical port for passing multiple wavelength collimated light to be demultiplexed. Multiple ports are arrayed in spaced relation to each other along a multiport surface of the optical block to receive respective the individual wavelength bands. With respective collimators that must be precisely coupled to the multiple ports, the optical multiplexing device can be bulky, expensive and susceptible to varying ambient conditions (e.g. temperature and vibrations).

Figure 1:
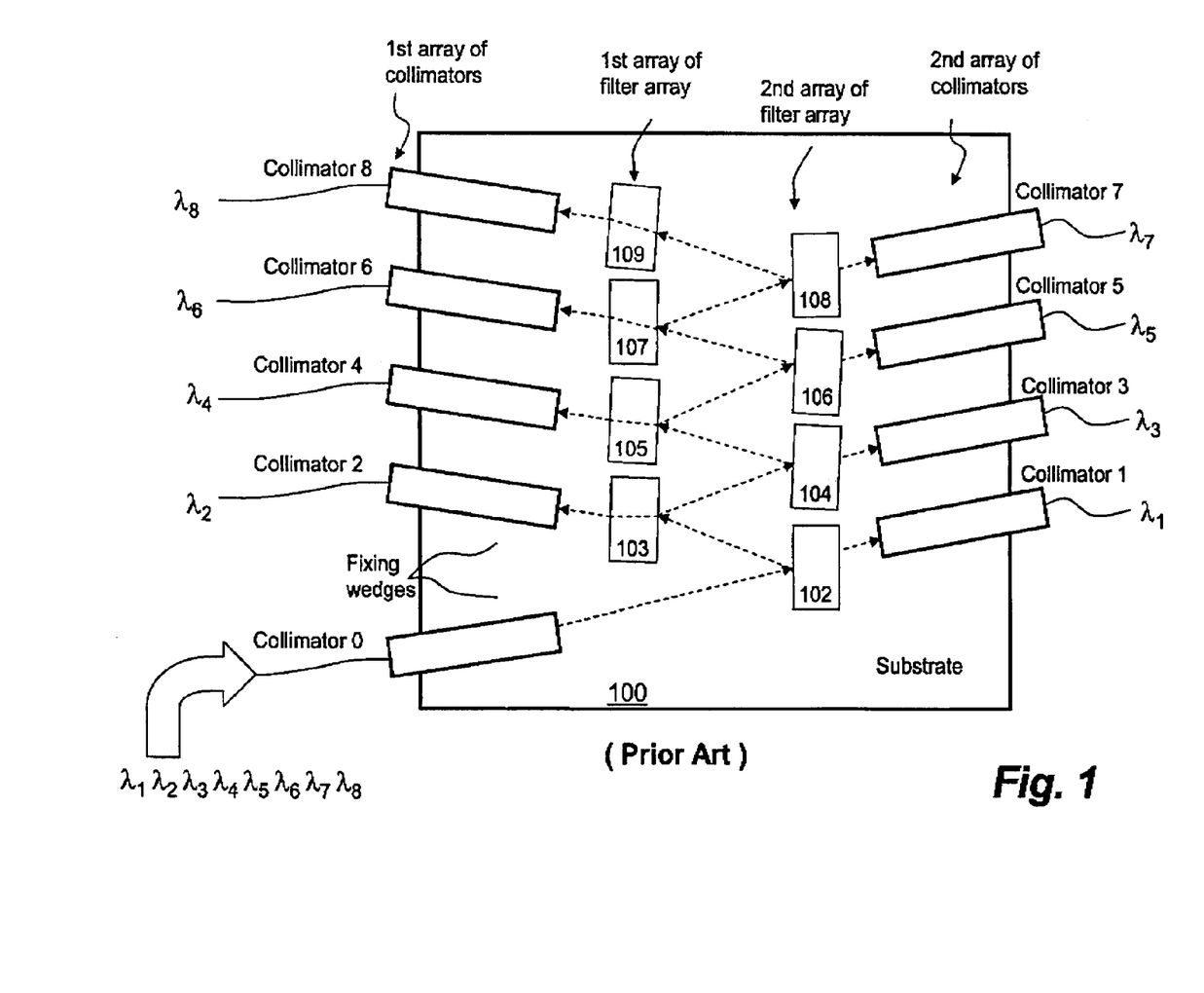
FIG. 1 (prior art) shows a compact WDM device.

Another optical multiplexing device, called compact WDM device, is to mount all WDM filters and collimating means on a common substrate. As shown in FIG. 1, where each of the WDM filters 102–109 and collimators 0–9 can be tuned separately and fixed to the common substrate. Thus, when a multiplex optical signal including, for example, eight different channels or wavelengths (e.g. $\lambda_1\ \lambda_2\ \lambda_3\ \lambda_4\ \lambda_5\ \lambda_6\ \lambda_7\ \lambda_8$), is coupled to a first collimator (i.e., Collimator 0), the optical signal is coupled to the filter 102 that transmits only $\lambda_1$ and the rest is reflected to the filter 103 that transmits $\lambda_2$ and reflects the rest. The rest of the signal continues to travel through the rest of the filters 104–109 and every time the signal hits a filter, a wavelength is filtered out and coupled to a collimator for output.

However, the compact WDM devices encounter serious problems with assembling tolerance. Analysis and experiment have proved that the assembly error that most sensitively degrades performance of the compact WDM devices is the amplified filter tilting error propagation. This situation can be understood from FIG. 2. If the first filter has a lateral tilt error of $\Delta\theta$, the remaining signal hitting the next filter, or simply the next drop channel $\lambda_2$ will experience two errors: the position has a lateral displacement $\sim\Delta\theta\cdot l$, and the incident angle has an error of $\Delta\theta$. As a result, the drop channel $\lambda_2$ suffers both in insertion loss and the central wavelength. For the next drop channel $\lambda_3$, however, the performance degradation is amplified since the beam reflected from filter tilt is $2\cdot\Delta\theta$ and the position lateral shift is $2\cdot\Delta\theta\cdot l$. As the beam cascading further down, the subsequent drop channel will suffer even more degradation.

In summary, for the nth drop channel, the incident beam will result in an angular error of $2\cdot\Delta\theta$ angular and a lateral shift error of $(n-1)\cdot\Delta\theta\cdot l$. This problem is significant in WDM modules configured for a large number of channels, where a minimal angular tilt of a filter, especially those used in the first few channels, will create amplified beam position deviation, both in lateral position and in angle, resulting in significant insertion loss.

There thus has been a need for compact WDM modules that minimize the problem of error amplification as discussed above and provide high tolerance for manufacturing with high yield.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

In general, the present invention pertains to improved designs of multiplexing/demultiplexing modules. According to one aspect of the present invention, at least a concave mirror is used to compensate the filter tilting errors. For a multiplexing/demultiplexing module configured for N channels, when the number of concave mirrors is less than N, each of the concave mirrors is placed where an incident traveling distance of a light beam is substantially similar or equal to the reflected traveling distance of the light beam. In other words, at least one concave mirror is provided to compensate the filter tilting errors. When the number of concave mirrors is N, each of the concave mirrors is placed to compensate the filter tilting errors, resulting in a multiplexing/demultiplexing module with no filter tilting errors at all. Depending on the implementation and a specific requirement for a multiplexing/demultiplexing module, a concave mirror may be made in accordance with a sphere or an oblate spheroid. Significantly different from the prior art modules or devices, the multiplexing/demultiplexing modules by the present invention possess no or minimized filter tilting errors.

According to one embodiment, the present invention is a multiplexing/demultiplexing module comprising at least a concave mirror placed in such way that an incident traveling distance of a light beam to the concave mirror is equal or substantially similar to a reflective traveling distance of the light beam from the concave mirror, wherein any titling errors carried in the light beam are compensated by the light beam going to and reflecting from the concave mirror.

According to another one embodiment, the present invention is a multiplexing/demultiplexing module comprising at least N optical filters, each specified for one of the N channels and transmitting an in-band signal and reflecting all out-band signals; and N concave mirrors, each placed in front of one of the N optical filters to receive the out-band signals for correcting titling errors carried in the out-band signals as a result of the one of the N optical filters being titled.

According to still another embodiment, the present invention is a method for making a multiplexing/demultiplexing module configured N channels, the method comprising providing at least a concave mirror; and placing the concave mirror in such way that an incident traveling distance of a light beam to the concave mirror is equal or substantially similar to a reflective traveling distance of the light beam from the concave mirror, wherein any titling errors carried in the light beam are compensated by the light beam going to and reflecting from the concave mirror.

One of objects, features, and advantages of in the present invention is to provide multiplexing/demultiplexing module with no or minimized filter tilting errors.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of multiplexing/demultiplexing modules. Traditional modules require precise alignment of optical filters, resulting in high costs, or possess filter tilting errors that incur high insertion losses. According to one aspect of the present invention, at least a concave mirror is used to compensate the filter tilting errors. For a multiplexing/demultiplexing module configured for N channels (e.g., N=8), when the number of concave mirrors is less than N, each of the concave mirrors is placed where an incident optical distance is substantially similar or equal to the reflected optical distance. In other words, at least one concave mirror is provided to compensate the filter tilting errors. When the number of concave mirrors is N, each of the concave mirrors is placed to compensate the filter tilting errors, resulting in a multiplexing/demultiplexing module with no filter tilting errors at all. Significantly different from the prior art modules or devices, the multiplexing/demultiplexing modules by the present invention possess no or minimized filter tilting errors.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 3:
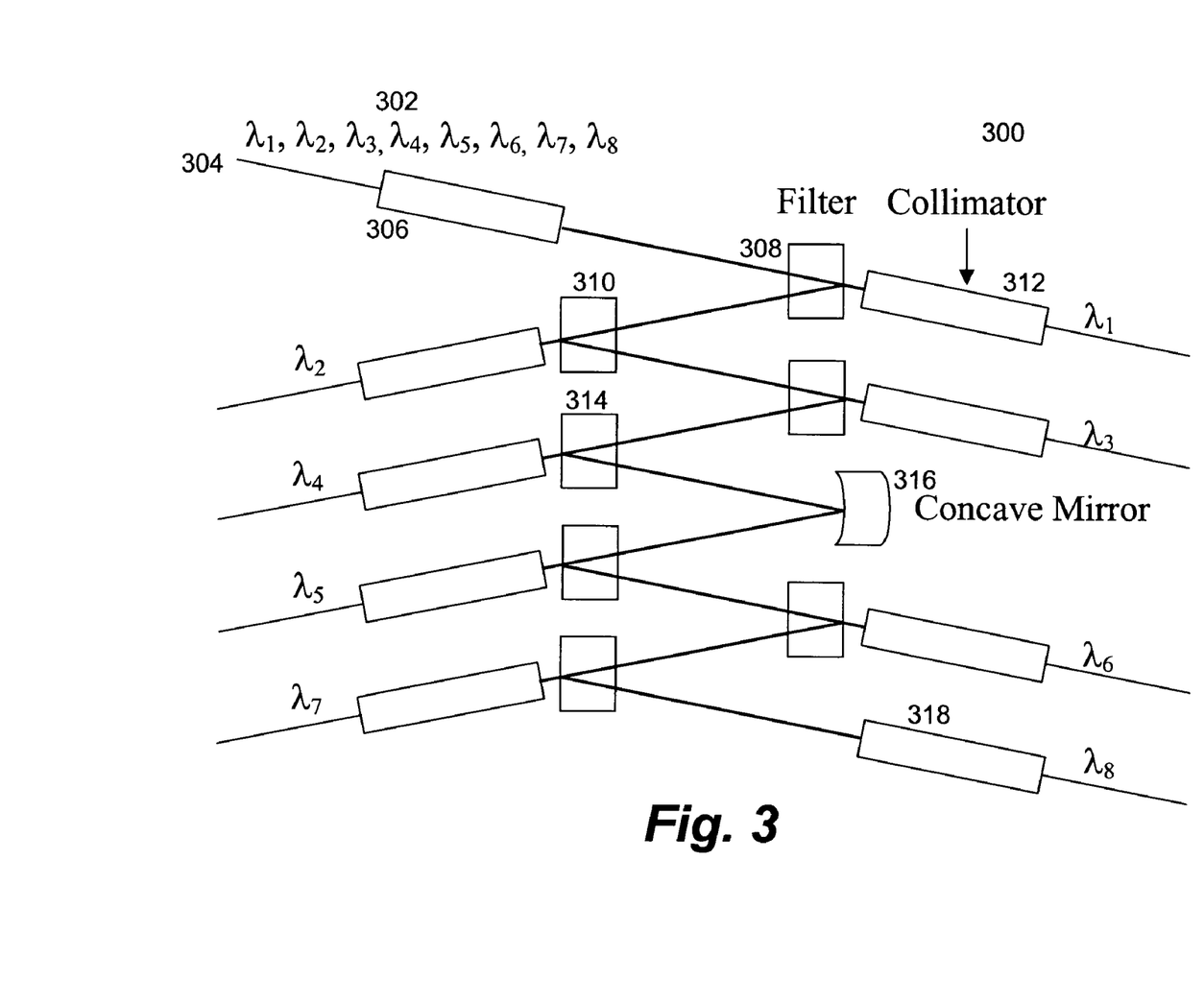
FIG. 3 shows a multiplexing/demultiplexing module with a concave mirror according to one embodiment of the present invention.

Referring now to the drawings, in which like numerals refer to like parts throughout the several views. FIG. 3 illustrates a multiplexing/demultiplexing module 300 according to one embodiment of the present invention. To facilitate the description of the present invention, a top view of the module 300 is shown and it is assumed that the module 300 is used for de-multiplexing a multiplexed signal including, for example, eight different channels or wavelengths (e.g. $\lambda_1\ \lambda_2\ \lambda_3\ \lambda_4\ \lambda_5\ \lambda_6\ \lambda_7\ \lambda_8$). It is understood to those skilled in the art that, when the optical paths are reversed, the same module can be used for multiplexing.

An optical signal 302 is coupled into the module 300 from a collimator 306 through a pigtail fiber 304. The collimated light from the collimator 306 is split into two beams at a first filter 308. The filter is configured to transmit only channel (i.e., in-band signal) and reflect others (i.e., out-band channels). One of the two beam at the filter 308 is the in-band signal (e.g., at a wavelength $\lambda_1$) transmitted through the filter 308 and subsequently coupled out of the module 300 by a collimator 312. The second beam is the remaining out-band channels (i.e., all wavelengths except for $\lambda_1$) reflected to the next filter 310 for subsequent demultiplexing.

Essentially, every time the second beam hits a filter, an in-band channel is transmitted through, resulting in a drop of a wavelength from the remaining out-band channels. The beam is reflected from the filter 314, as this time, the beam includes the remaining wavelengths $\lambda_5$ $\lambda_6$ $\lambda_7\lambda_8$. Apart from the prior art modules, the beam impinges onto, instead of another filter, a concave mirror 316 that reflects the beam to the next filter for further demultiplexing till all remaining wavelengths $\lambda_5$ $\lambda_6$ $\lambda_7$ $\lambda_8$ are respectively coupled out.

Figure 4A:
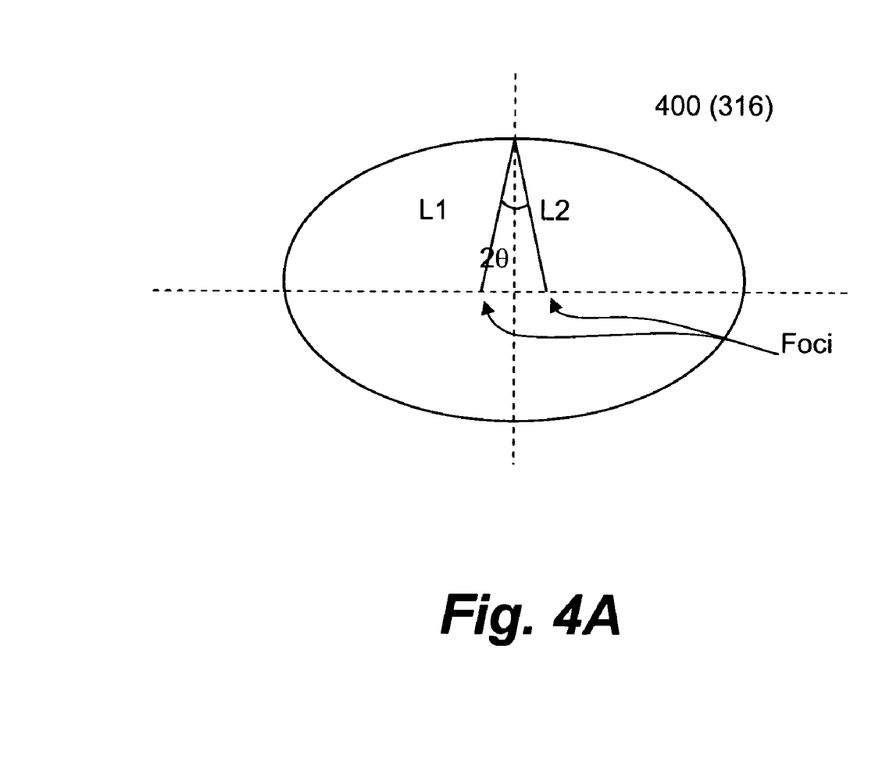
FIG. 4A illustrates an example of an concave mirror shaped in a portion of an oblate spheroid, where a complete ellipse is shown to facilitate the understanding of the mirror.

One of the functions provided by the concave mirror 316 is to compensate the tilting error propagation commonly seen in the prior art modules, for example, in FIG. 1. According to one embodiment, the concave mirror 316 is an oblate spheroid, as illustrated in FIG. 4A, with distances L1 and L2, from its foci to its reflection surface. Distance L1 or L2 is defined herein as an optical distance equal to the beam traveling distance from, for example, the filter 308 to the concave mirror 316 or from the concave mirror 316 to the last collimator 318, respectively. The incident angle θ from one of its foci to the spheroid surface equals to the beam incident angle on the filter 318. More specifically, L1 and L2 may be referred to an incident traveling distance and a reflective traveling distance of a light beam. In a preferred embodiment, L1 and L2 are identical. In a case in which it is sometimes difficult (e.g., N is an odd number) to have L1 and L2 identical, the tilting errors can still be reduced when L1 and L2 are substantially similar.

Figure 4B:
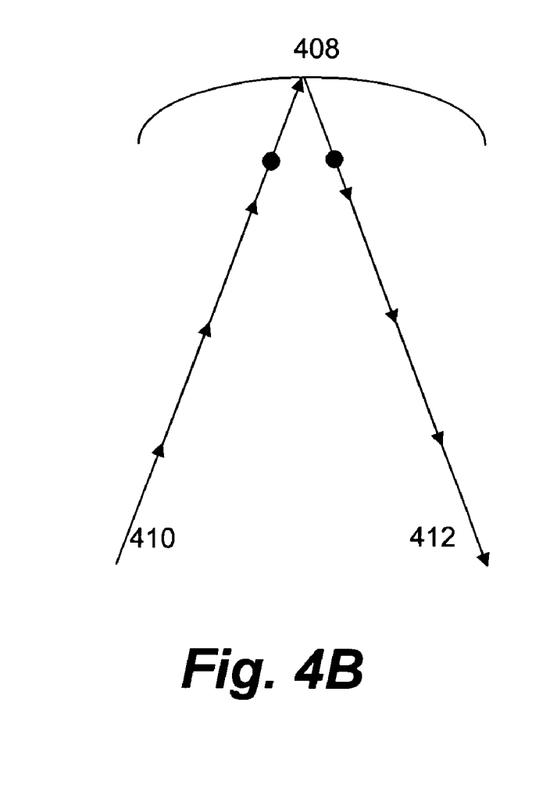
FIG. 4B shows an ellipse (i.e. a projected view of an concave mirror) receiving an incident light beam from one of the two foci thereof and reflecting the incident light beam via another one of the two foci thereof.

It is well known that an ellipse has the characteristics in which a light beam coming from one of the two foci will be reflected out through another one of the foci as shown in FIG. 4B. In accordance with FIG. 3, FIG. 4B shows an incident light beam 410 representing four cascaded optical paths come from one of the two foci of the ellipse 408 (i.e., a side view of a partial oblate spheroid), the light beam 410 is reflected through another one of the foci as a reflected light beam 412.

Figure 2:
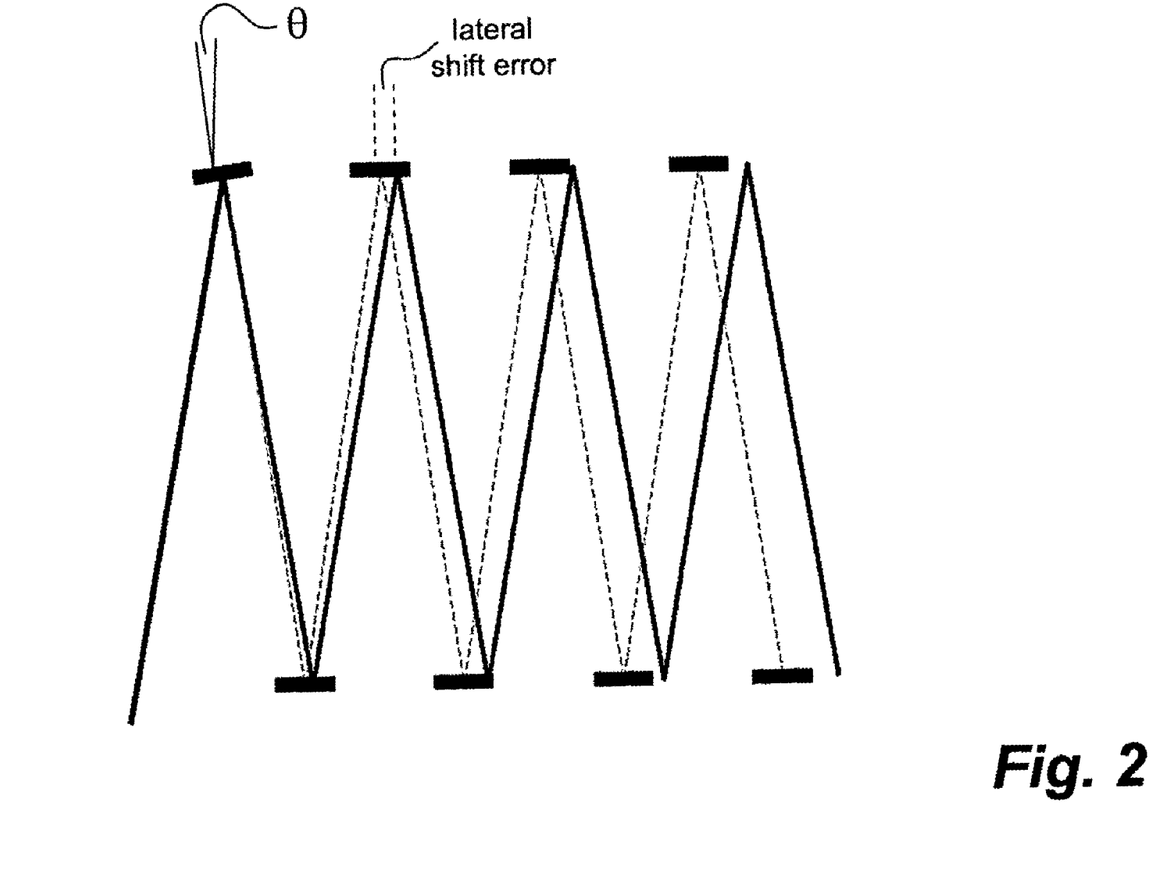
FIG. 2 illustrates an angular error and a lateral shift error as a result of the filter being tilted.
Figure 5:
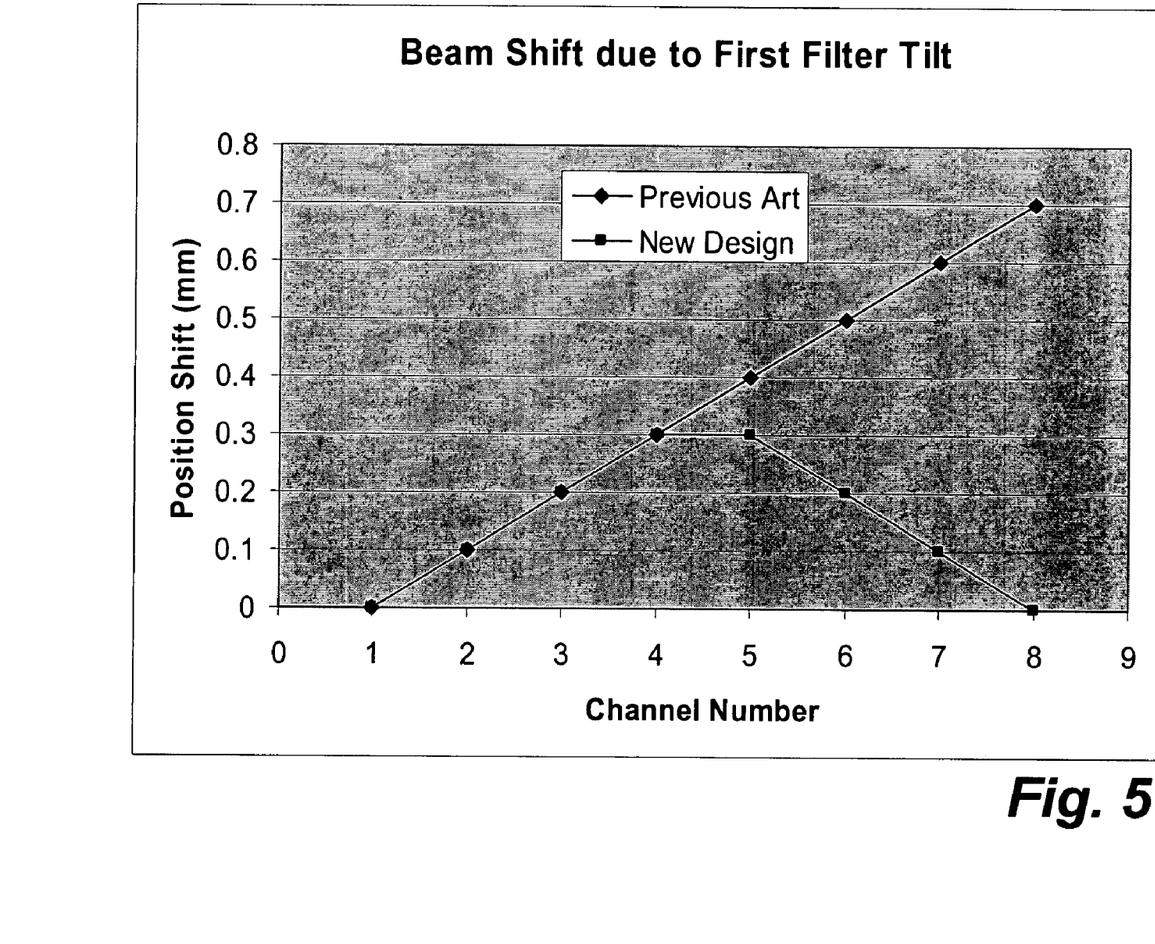
FIG. 5 shows a comparison between a conventional compact WDM demultiplexer and an embodiment of the present invention using a single oblate spheroid mirror.

Specifically, if the first filter 308 results in a lateral tilt error of Δθ, the following drop channels $\lambda_2$–$\lambda_4$ will experience the two errors as shown in FIG. 2: the position has a lateral displacement ~Δθ·l, and the incident angle has an error of Δθ. However, the errors are reduced after the beam is reflected from the concave mirror 316 (e.g., an ellipsoid concave mirror). The errors in channel $\lambda_5$ will have a reduced position lateral displacement and reduced angular error, instead of continuing increasing or amplifying the errors, as exhibited in the conventional compact WDM multiplexer. For channel $\lambda_6$ the errors are further reduced. For the last channel $\lambda_8$, the errors are completely compensated. The performance comparison between a conventional compact WDM demultiplexer and the present invention is shown in FIG. 5.

Figure 6:
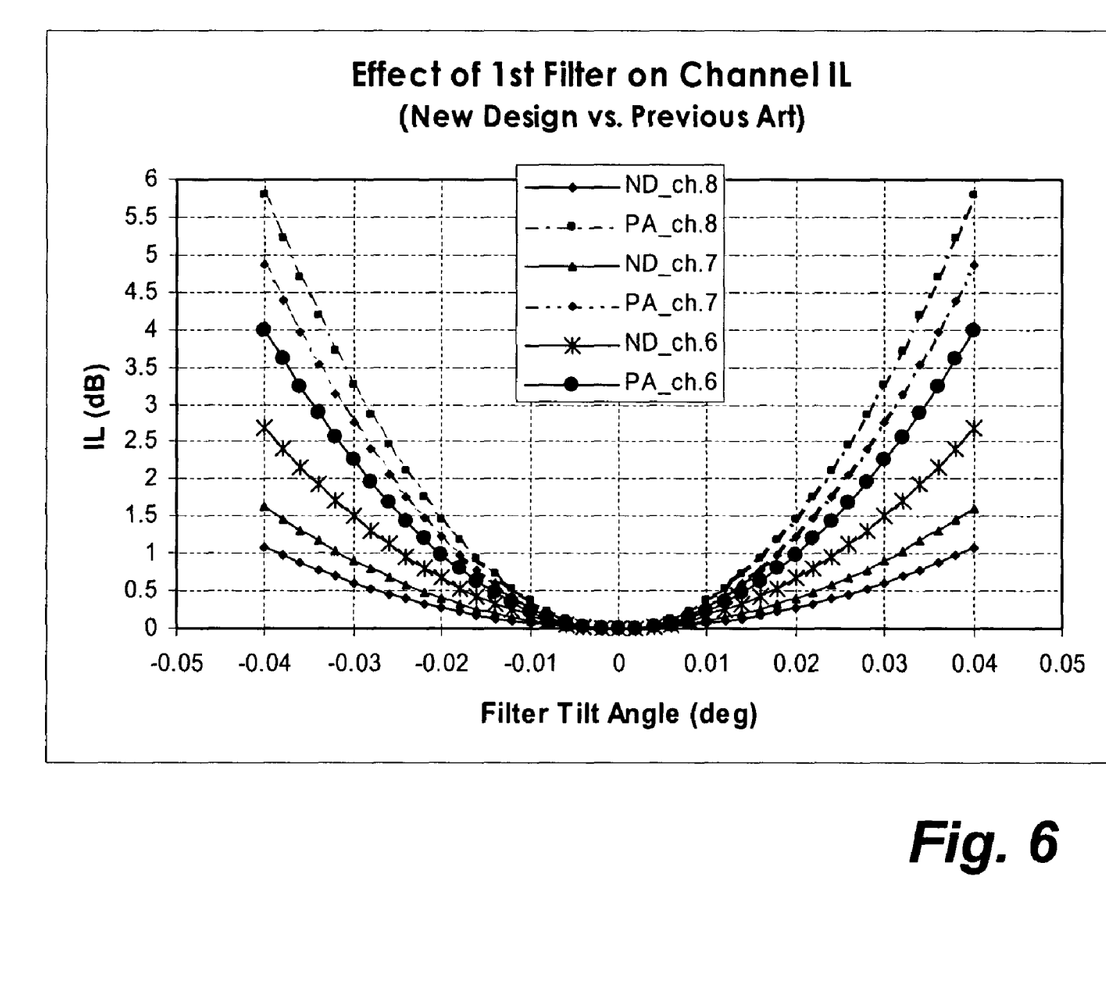
FIG. 6 shows a comparison between a conventional compact WDM demultiplexer and an embodiment of the present invention using a single spherical mirror.

According to one embodiment, a spherical concave mirror with a radius of L1 is used. As a result, in comparison with the oblate spheroid surface, the position and angular error in the last collimator 318 are not completely, but, partially compensated. A detailed calculations on using a spherical mirror with radius L1, assuming the collimator output beams having Gaussian profiles, and using overlap integrals between the common collimator and the add/drop collimators are performed. The results are compared between using previous art and using the present new design and summarized in FIG. 6. Evidently, the effects of the first filter tilting on the latter channels of the cascading add/drop sequence have reduced.

Figure 7:
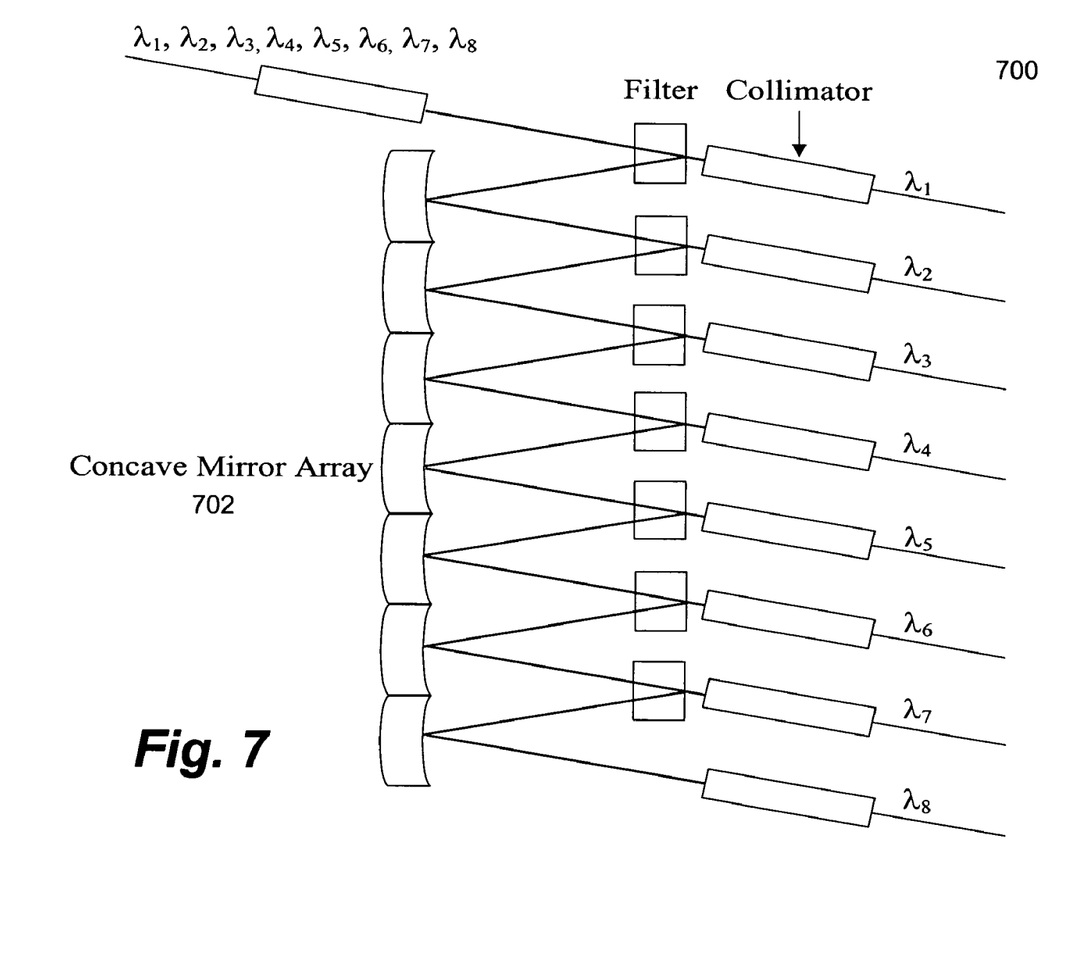
FIG. 7 shows a multiplexing/demultiplexing module according to one embodiment of the present invention employing an array of concave mirrors.
Figure 8:
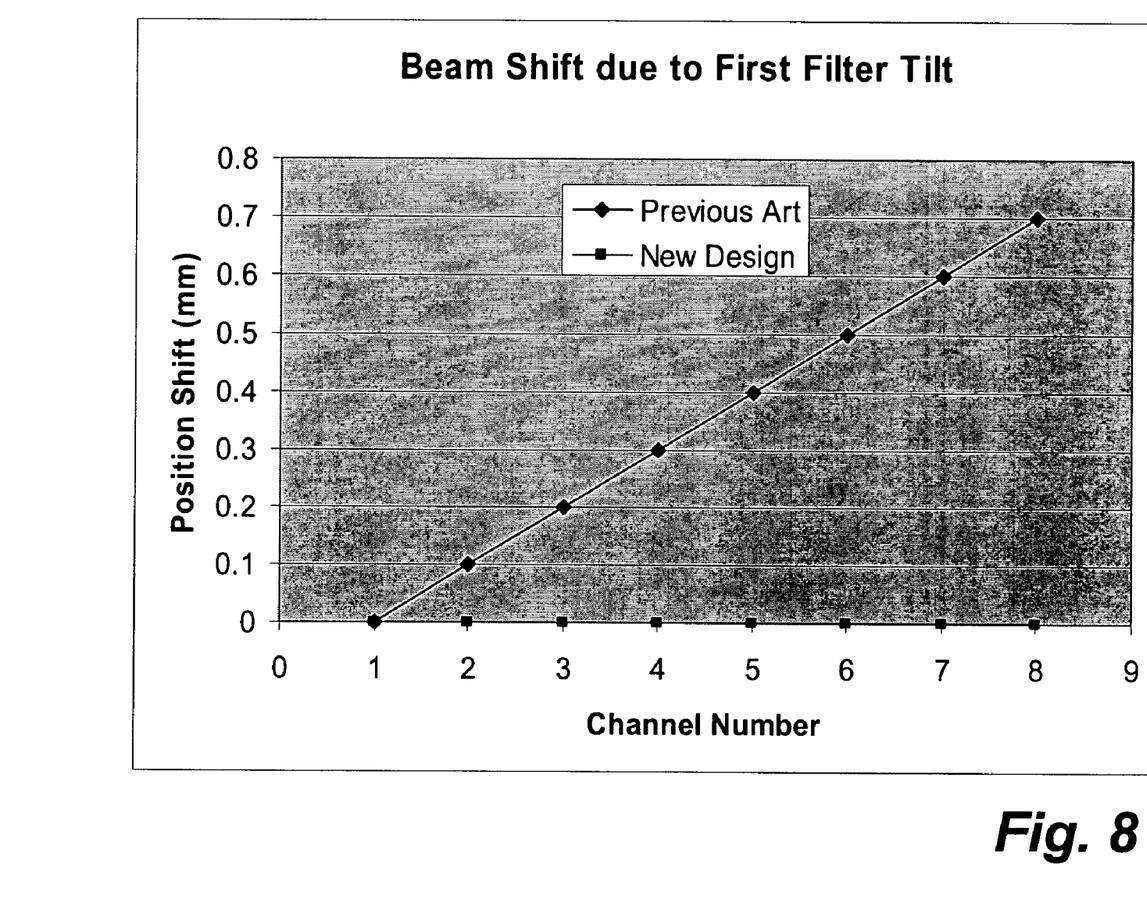
FIG. 8 shows a comparison between a conventional compact WDM demultiplexer and an embodiment of the present invention using an array of concave mirrors.

Referring now to FIG. 7, there shows another multiplexing/demultiplexing module 700 according to one embodiment of the present invention. The module 700 includes an array of concave mirrors 702. Given the description above, it can be appreciated that errors are not amplified at all and corrected immediately in a concave mirror. In other words, positional and angular errors generated by any prior filter tilting are completely compensated for all following channels through the oblate spheroid concave mirror array as shown in FIG. 8.

One of the features in the present invention is to provide at least a concave mirror to compensate the filter tilting errors. For a multiplexing/demultiplexing module configured for N channels and with tolerable filter tilting errors, the number of concave mirrors can be less than N, where each of the concave mirrors is placed in such way that an incident optical distance is substantially similar to the reflected optical distance. When it is desired for a multiplexing/demultiplexing module configured for N channels and without any tolerable filter tilting errors, the number of concave mirrors is N and each of the concave mirrors is placed to compensate the filter tilting errors. Depending on the implementation and a specific requirement for a multiplexing/demultiplexing module, a concave mirror may be made in accordance with a sphere or an oblate spheroid.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A multiplexing/-demultiplexing module configured for N channels, the module comprising:
   at least a concave mirror placed in such way that an incident traveling distance of a light beam to the concave mirror is equal or substantially similar to a reflective traveling distance of the light beam from the concave mirror, wherein any titling errors carried in the light beam as a result of structure errors in the module are compensated by the light beam going to and reflecting from the concave mirror; and
   at least N optical filters, each specified for one of the N channels, wherein the concave mirror is placed right after one half of the N optical filters.

2. The module as recited in claim 1, wherein the titling errors are symmetrically compensated.

3. The module as recited in claim 2, wherein the concave mirror has a shape substantially similar to a portion of a sphere, the titling errors successively introduced by a first half of the N filters are successively reduced over a second half of the N filters.

4. The module as recited in claim 2, wherein the concave mirror has a shape substantially similar to a portion of an oblate spheroid, the titling errors successively introduced by a first half of the N filters are successively compensated over a second half of the N filters.

5. The module as recited in claim 1, wherein the concave mirror is made in accordance with a sphere or an oblate spheroid.

6. The module as recited in claim 1, wherein the concave mirror has a shape in accordance with a sphere or an oblate spheroid.

7. The module as recited in claim 1, wherein each of the titling errors includes an angular error and a lateral shift error as a result of one of the N filters being tilted.

8. A multiplexing/-demultiplexing module configured for N channels, the module comprising: at least N optical filters, each specified for one of the N channels and transmitting an in-band signal and reflecting all out-band signals; and N concave mirrors, each placed in front of one of the N optical filters to receive the out-band signals for correcting titling errors carried in the out-band signals as a result of the one of the N optical filters being titled, wherein each of the N concave mirrors is placed in such as way that an incident optical distance from one of the optical filters is substantially similar to a reflected optical distance to another one of the optical filters.

9. The module as recited in claim 8, wherein the concave mirrors are all in identical shape.

10. The module as recited in claim 9, wherein the shape is in accordance with a sphere or an oblate spheroid.

11. The module as recited in claim 9, further comprising N collimators, each associated with one of the N optical filters and receiving the in-band signal of the one of the N optical filters.

12. A method for making a multiplexing/demultiplexing module configured N channels, the method comprising:
  providing at least a concave mirror;
  placing the concave mirror in such way that an incident traveling distance of a light beam to the concave mirror is equal or substantially similar to a reflective traveling distance of the light beam from the concave mirror, wherein any titling errors carried in the light beam as a result of structure errors in the module are compensated by the light beam going to and reflecting from the concave mirror; and
  providing a first half of N optical filters for multiplexing/demultiplexing a first half of the N channels, each of the N optical filters specified for one of the N channels and transmitting an in-band signal and reflecting all out-band signals.

13. The method as recited in claim 12, wherein the out-band signals from the first half of N optical filters are impinged upon the concave mirror and reflected as a reflected beam that goes through a second half of the N optical filters for multiplexing/demultiplexing a second half of the N channels.

14. The method as recited in claim 13, wherein tilting errors successively introduced by the first half of the N filters are successively compensated as the reflected beam goes through the second half of the N filters.

15. The method as recited in claim 14, wherein the at least one concave mirror, when there are more than one, are all in identical shape.

16. The method as recited in claim 15, wherein the shape is in accordance with a sphere or an oblate spheroid.

17. The method as recited in claim 14, wherein each of the titling errors includes an angular error and a lateral shift error as a result of one of the N filters being tilted.

* * * * *